July 5, 1927.  
A. R. MEISTER  
1,634,430  
FLEXIBLE FOUR-WHEELED DRIVING TRUCK  
Filed June 29, 1925    2 Sheets-Sheet 1
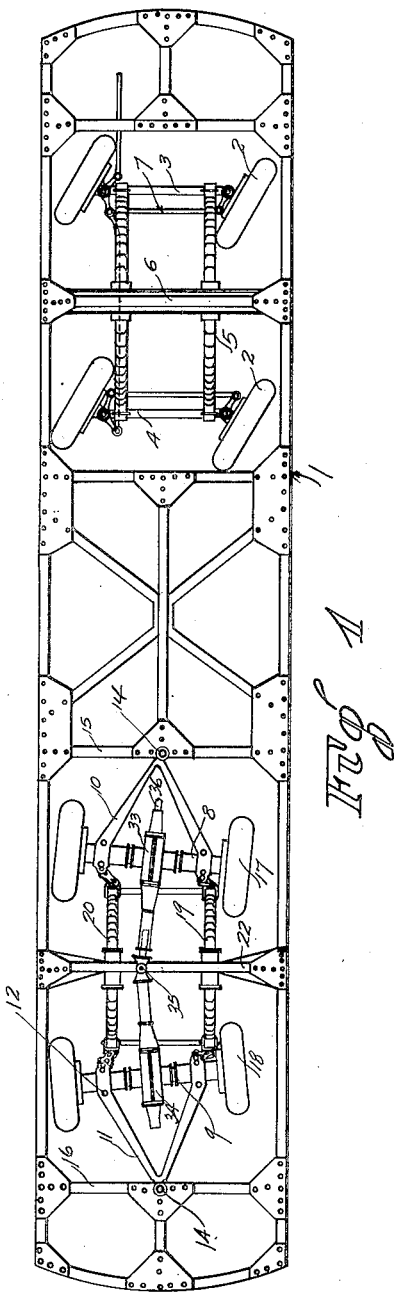
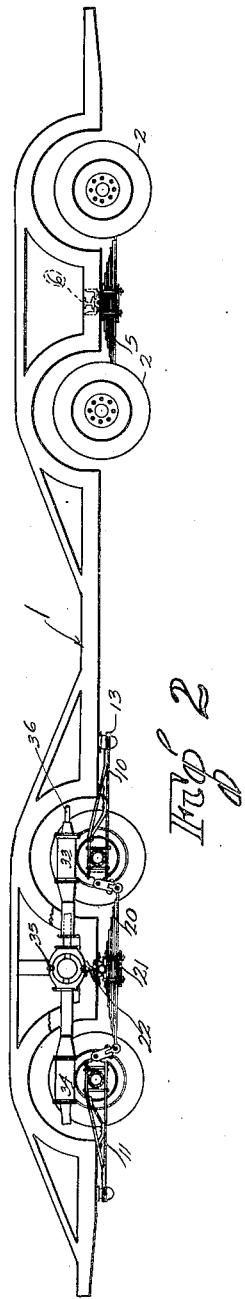
INVENTOR.  
A. R. MEISTER.  
BY  
ATTORNEY.

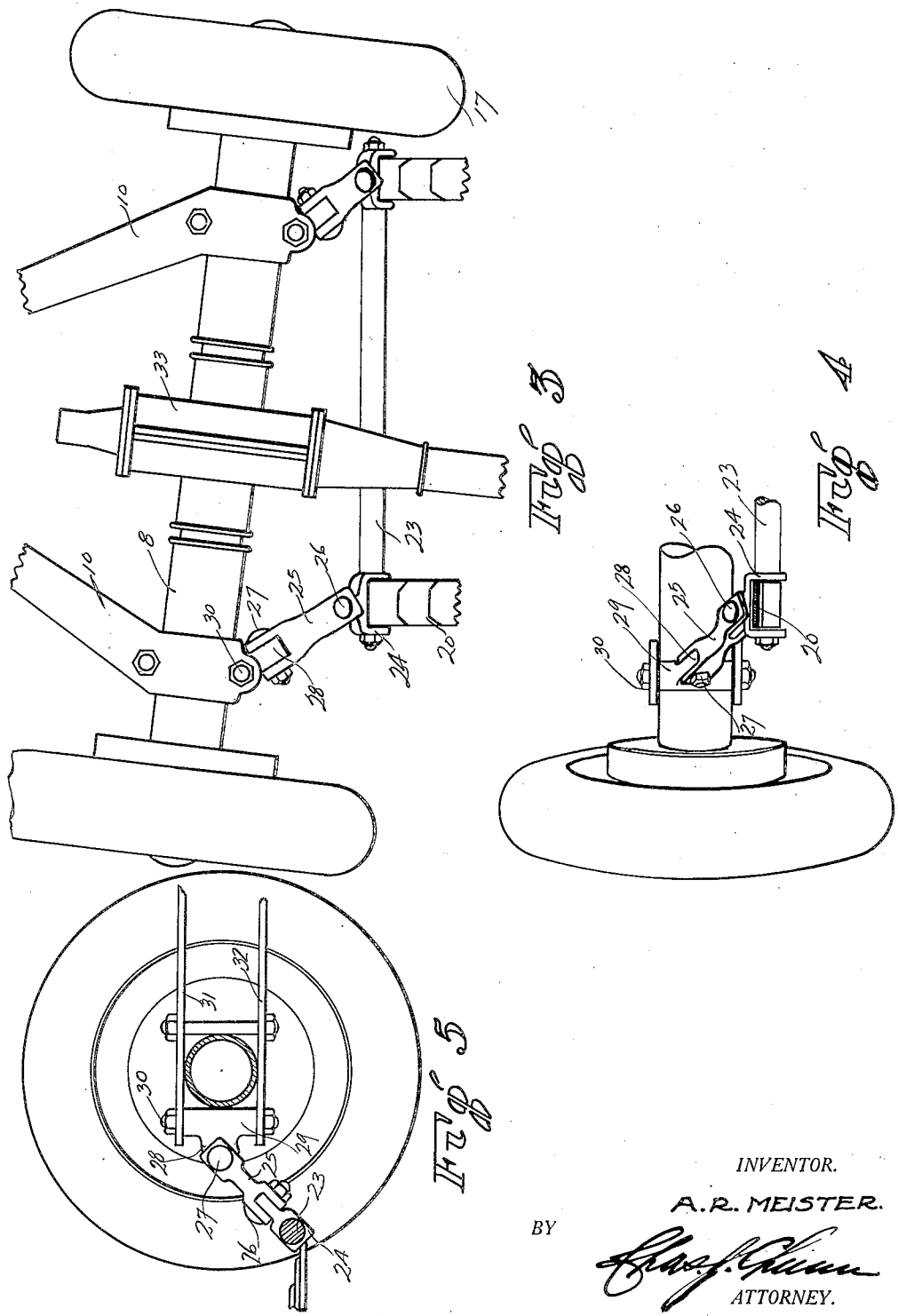

Patented July 5, 1927.

1,634,430

UNITED STATES PATENT OFFICE.

ALBERT R. MEISTER, OF SACRAMENTO, CALIFORNIA.

FLEXIBLE FOUR-WHEELED DRIVING TRUCK.

Application filed June 29, 1925. Serial No. 40,158.

This invention relates to improvements in motor vehicles and more particularly to a four wheeled driving truck for use in connection with large motor vehicles such as trucks, stages and the like, the invention consisting in the particular construction, relative arrangement and manner of mounting and driving and steering a four wheeled truck on a motor vehicle.

One of the objects of the invention is to provide a flexible, spring mounted four wheeled driving truck which will turn or "track" automatically incident to negotiating curves and turns.

Another object of the invention is to provide a four wheeled driving truck of the character described which may be mounted in a vehicle chassis so as to maintain a low center of gravity and which may have a driving power for the wheels applied from either end.

A further object of the invention is to provide a flexible four wheeled driving truck of the character described which is simple as to construction and arrangement, consists of comparatively few parts and is inexpensive.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a top plan view of the truck of my invention shown as when incorporated with a motor vehicle chassis.

Fig. 2 represents a side elevation of the truck of my invention, parts of the chassis being broken away and parts of the truck shown in section.

Fig. 3 represents an enlarged fragmentary plan view of a part of the truck particularly showing the manner of connecting the axle with the truck frame.

Fig. 4 represents an enlarged fragmentary perspective view partly in section of one of the swivel joints.

Fig. 5 represents an enlarged fragmentary side elevation of the parts shown in Figs. 3 and 4.

The truck of my invention is particularly designed for use in connection with six, eight and other multi-wheeled vehicles and in the present embodiment as shown in the accompanying drawing it is applied to an eight wheeled vehicle, the chassis 1 of which is shown. In the forward part of the chassis are four front wheels 2, which are mounted on axles 3 and 4 supported by the usual springs 5 fastened to a cross member 6 of the chassis. The wheels 2 are adapted to be turned or steered through an interconnected four wheel steering mechanism 7 such as is usually employed in the art.

The apparatus of my invention comprises two rear axles designated 8 and 9, which are provided with V-shaped connecting yokes 10 and 11. These yokes are suitably fastened as at 12 at their free ends to the axles 8 and 9 and their apexes are connected by suitable universal joints 13 and 14 to the cross members 15 and 16 of the chassis. A pair of driving wheels 17 is mounted on the axle 8 and similar driving wheels 18 are mounted on the axle 9. The two axles are connected to form a truck unit by means of vehicle springs 19 and 20, which springs are fastened by shackles 21 intermediate their ends to a cross member 22 on the chassis and are connected at their ends with the axles. The ends of the springs are joined by rigid bars or rods 23 and thus the springs and bars 23 comprise a flexible or spring mounted truck frame. Especially arranged and constructed means is provided for connecting the axles with the corners of the truck frame, or in other words the ends of the springs, so that the axle will be permitted to swing and permit tracking of the four rear wheels when the front wheels of the vehicle are turned and the vehicle moves accordingly.

This means comprises horizontally pivoted clevises 24 at the ends of the spring, to the intermediate portions of which clevises the inner ends of link portions 25 are vertically pivoted as at 26. The other ends of the link portions are horizontally pivoted as at 27 to lateral projections 28 carried on vertically disposed collars 29. These collars are mounted on vertical pivots 30 extending between upper and lower portions 31 and 32 of the free ends of the V-shaped yokes 11. This arrangement of the clevises, links and pivots provides for a free lateral swinging or turning of the axles and also permits of the desired relative movement between the springs and axles without depriving the construction of the desired rigidity and strength.

To provide for driving the wheels, the axles have the usual differential gearing, not shown, mounted in the housings 33 and 34. The housings 33 and 34 are provided at opposed ends with tubular extensions which are connected by a suitable universal joint, generally designated 35. In the present instance, from the forward end of the differential housing 33 is a drive shaft 36 which is connected with the motor, not shown, of the motor vehicle. The arrangement, however, provides for driving from the other end of the truck if desired, and in either instance it is necessary to employ another universal joint between the drive shaft 36 and the engine or motor, it being thought unnecessary to show this commonly employed driving connection. The arrangement of the axles, spring and driving connection is such that the four wheels of the truck may be effectively driven, regardless of the relative positions of the wheels, axles, etc. The links 25 connected with the axles and springs in the particular manner of this invention provide for freedom of movement of the axles as is required to cause the tracking of the wheels on turning of the vehicle and also permits of proper spring action. The V-shaped yokes 10 and 11 pivoted to cross members of the frame for securely anchoring the truck to the chassis cause the wheels to track when the vehicle is turned as shown in Fig. 1. When the front wheels of the vehicle are turned to the right in order that the vehicle may be made to negotiate a right turn, the wheels 17 on the rear axle 8 will, due to the force applied to the wheels through the movement of the vehicle, also turn to the right, whereas the wheels 18 on the rear axle will turn in the opposite direction. In this way a comparatively long vehicle such as is comprised in a multi-wheeled vehicle, may be easily and safely handled in making sharp turns and all tendency of non-tracking of the rear wheels or imposition of lateral strains thereon as takes place where they are not permitted to turn, is prevented. The principal points of advantage which characterizes the truck of this invention are that the truck is made exceptionally flexible and light without depriving it of requisite strength and durability and furthermore provision is made for driving the four wheels in spite of the flexible connections of the axles and other parts of the truck with the frame.

Another advantage of the invention is the provision for comparatively low mounting of the entire truck in a motor vehicle chassis whereby a low center of gravity may be maintained in the motor vehicle in which the truck is incorporated.

I claim:

1. In combination with a motor vehicle having a chassis and front wheels mounted on the chassis there being means for steering said wheels, of a rear driving truck for said vehicle comprising axles, wheels on the axles, a yoke extending forwardly from the front of the two axles and having a universal joint connection with the chassis, a yoke extending rearwardly of the two axles and having a universal joint connection with the chassis, springs fastened to the chassis and disposed between the axles, means for establishing a flexible connection between the springs and said axles, which means permits of lateral swinging of the axles and vertical movement thereof also relative to the springs and a driving connection between the axles, wheels and motor of a motor vehicle providing for driving the four wheels of said rear truck.

2. In combination with a motor vehicle having a chassis and front wheels mounted on the chassis there being means for steering said wheels, of a rear driving truck for said vehicle comprising axles, wheels on the axles, a yoke extending forwardly from the front of the two axles and having a universal joint connection with the chassis, a yoke extending rearwardly of the two axles and having a universal joint connection with the chassis, springs fastened to the chassis and disposed between the axles, means for establishing a flexible connection between the springs and said axles, which means permits of lateral swinging of the axles and vertical movement thereof also relative to the springs, a driving connection between the axles, wheels and motor of the motor vehicle providing for driving the four wheels of said rear truck, which driving connection comprises rigid portions extending from the axles and constituting housings for part of the driving means and a universal joint joining said rigid portions.

3. In combination with a motor vehicle having a chassis and front wheels provided with means for steering them, of a driving truck for said motor vehicle comprising axles, driving wheels on the axles, a connection between the chassis and said axles comprising yokes which are fastened to the axles and pivoted to the chassis, springs fastened on the chassis, bars extending between and joining end portions of said springs with one another, means of connection between the ends of the springs and said axles providing for lateral and vertical swinging of the axles and means for establishing a driving action between the motor of the vehicle and wheels of the driving truck.

ALBERT R. MEISTER.